US010165103B2

(12) United States Patent
Choi (10) Patent No.: US 10,165,103 B2
(45) Date of Patent: Dec. 25, 2018

(54) SYSTEM FOR SENDING MESSAGE FOR EACH OF INVITED MOURNERS AT TIME AFTER DEATH AND METHOD FOR SENDING AFTER-DEATH MESSAGE USING SAME

(71) Applicant: Suk Il Choi, Goyang-si (KR)

(72) Inventor: Suk Il Choi, Goyang-si (KR)

( * ) Notice: Subject to any disclaimer, the term of this patent is extended or adjusted under 35 U.S.C. 154(b) by 0 days.

(21) Appl. No.: 15/769,738

(22) PCT Filed: Oct. 19, 2016

(86) PCT No.: PCT/KR2016/011752
§ 371 (c)(1),
(2) Date: Apr. 20, 2018

(87) PCT Pub. No.: WO2017/069513
PCT Pub. Date: Apr. 27, 2017

(65) Prior Publication Data
US 2018/0309865 A1 Oct. 25, 2018

(30) Foreign Application Priority Data
Oct. 20, 2015 (KR) .......................... 10-2015-0146281

(51) Int. Cl.
*H04W 4/12* (2009.01)
*H04M 1/725* (2006.01)
(Continued)

(52) U.S. Cl.
CPC ....... *H04M 1/72538* (2013.01); *H04W 4/023* (2013.01); *H04W 4/12* (2013.01); *H04W 4/024* (2018.02)

(58) Field of Classification Search
CPC ......... H04W 4/02; H04W 4/12; H04W 40/02; H04W 40/24; H04W 4/06; H04W 84/18;
(Continued)

(56) References Cited

U.S. PATENT DOCUMENTS

2012/0197949 A1* 8/2012 Taylor .................... G06Q 10/06
707/808
2013/0144960 A1* 6/2013 Salamat ................ H04L 12/588
709/206
(Continued)

FOREIGN PATENT DOCUMENTS

JP 2010-186397 8/2010
KR 10-2010-0063962 6/2010
(Continued)

OTHER PUBLICATIONS

International Search Report dated Feb. 24, 2017, issued in International Application No. PCT/KR2016/011752.

*Primary Examiner* — Michael T Vu
(74) *Attorney, Agent, or Firm* — H.C. Park & Associates, PLC (57) ABSTRACT

A message sending system, the system including: a member terminal of a member; a main server connected to the member terminal through a wired or wireless network; and an emergency contact terminal having a predetermined relationship with the member terminal, information of the emergency contact terminal is registered in the main server, wherein the member terminal is configured to upload, to the main server, a list of mourners comprising a list of persons to be invited as mourners and a message to be delivered to each of the mourners, and wherein the main server is configured to: determine, through the member terminal and the emergency contact terminal, the time of death of the member having the member terminal, and in response to determining the time of death of the member, send a notice of the member's death to mourner terminals registered in the list of mourners.

10 Claims, 5 Drawing Sheets

(51) Int. Cl.
*H04W 4/02* (2018.01)
*H04W 4/024* (2018.01)

(58) Field of Classification Search
CPC ......... H04W 8/08; H04W 8/22; H04W 24/06; H04W 48/16; H04W 48/18; H04W 80/04
USPC .................................................. 455/404–407
See application file for complete search history.

(56) References Cited

U.S. PATENT DOCUMENTS

2014/0306801 A1* 10/2014 Mansfield .............. G06Q 50/01
340/7.58
2017/0011210 A1 1/2017 Cheong et al.

FOREIGN PATENT DOCUMENTS

| KR | 10-2012-0090664 | 8/2012 |
| KR | 10-2014-0011789 | 1/2014 |
| KR | 10-2015-0099430 | 8/2015 |

* cited by examiner

SYSTEM FOR SENDING MESSAGE FOR EACH OF INVITED MOURNERS AT TIME AFTER DEATH AND METHOD FOR SENDING AFTER-DEATH MESSAGE USING SAME

CROSS-REFERENCE TO RELATED APPLICATIONS

This application is the National Stage Entry of International Patent Application No. PCT/KR2016/011752, filed on Oct. 19, 2016, and claims priority from and the benefit of Korean Patent Application No. 10-2015-0146281, filed on Oct. 20, 2015, each of which is incorporated by reference for all purposes as if fully set forth herein.

BACKGROUND

Field

Exemplary embodiments of the invention relate generally to a system for sending message for each of invited mourners at time after death and method for sending after-death message using the system, and more specifically, system and method for accurately identifying the time of death of the dead person, promptly sending a notice of death to mourners, and if the mourners condoled by visiting funeral hall, the dead person can send a greeting message to the mourners.

Discussion of the Background

Generally, it is common in Korea taking 3-days-burying which means burying the dead three days after his/her death. In the process of taking the 3-days-burying, the chief mourner or bereaved families notifies and invites mourners directly.

In other words, conventionally, when bereaved families face the death of a family member, it is inconvenient for the bereaved families to directly inform the acquaintances of deceased person or the surrounding relatives about the death of the deceased person and the funeral process through the wire or other methods. This has been a very troublesome problem for the bereaved families which should take funeral process.

In addition, as the standard of living in the society as a whole has improved in recent years, the public is increasingly aware of the dignified death. And the thought about death, the way to cope with death, and the meaning about funeral ritual are different compared to the past. In other words, those who are about to die have a desire to invite those who want to join with them through funeral procedures and to deliver messages that they could not normally deliver to them.

In order to satisfy such needs, it is a reality that a technique relating to a new funeral procedure or a notice of death is required by combining a personal portable terminal such as a smart phone with wired/wireless network technology.

The above information disclosed in this Background section is only for understanding of the background of the inventive concepts, and, therefore, it may contain information that does not constitute prior art.

SUMMARY

Devices constructed and methods according to exemplary embodiments of the invention may provide system for sending message for each of invited mourners at time after death and method for sending after-death message using the system, which may accurately identify the time of death of the deceased person and timely notify the death to mourners, and send message to the mourners at the funeral and at a certain time after the death of the deceased person.

Additional features of the inventive concepts will be set forth in the description which follows, and in part will be apparent from the description, or may be learned by practice of the inventive concepts.

According to one or more exemplary embodiments of the invention, a message system, the system may include: a member terminal of a member; a main server connected to the member terminal through a wired or wireless network; and an emergency contact terminal having a predetermined relationship with the member terminal, information of the emergency contact terminal is registered in the main server, wherein the member terminal may be configured to upload, to the main server, a list of mourners comprising a list of persons to be invited as mourners and a message to be delivered to each of the mourners, and wherein the main server may be configured to: determine, through the member terminal and the emergency contact terminal, the time of death of the member having the member terminal, and in response to determining the time of death of the member, send a notice of the member's death to mourner terminals registered in the list of mourners.

The member terminal may include: a biometrics module configured to collect biometric information of the member having the member terminal; and a Global Positioning System (GPS) module configured to identify a position of the member terminal, wherein the member terminal may be configured to transmit the biometric information of the member collected by the biometrics module and the position of the member terminal identified through the GPS module to the main server.

The message sending system may further include: a beacon terminal disposed at a specific location of a funeral hall, the beacon terminal configured to: measure position of the mourner terminal by a near field communication with the mourner terminal; and transmit the measured position of the mourner terminal to the main server.

The main server may be configured to send a funeral guiding message for guiding location of funeral service to the mourner terminal in response to the beacon terminal determining that the position of the mourner terminal is at a specific position of the funeral hall.

The main server is configured to send a greeting message uploaded by the member terminal to the mourner terminal in response to the beacon terminal determining that the position of the mourner terminal is at a specific position of the funeral hall.

The main server is configured to send a final message to the mourner terminal in response to passing of a predetermined time after the death of member having the member terminal.

According to one or more exemplary embodiments of the invention, a method for sending message to invited mourners using a message transmission system including a main server, a member terminal, an emergency contact terminal, and mourner terminals, the method may include: uploading, by the member terminal, a list of mourners including a list of persons to be invited as mourners to the main server; uploading messages to be sent to each of the mourner terminals of the mourners; identifying funeral information; sending, by the main server, a notice of death to the mourner terminal in response to identifying the funeral information;

sending, by the main server, the messages to the mourner terminal in response to determining that the mourner terminal is located at a specific position in a funeral hall.

The sending of the messages may include: sending, by the main server, a funeral guiding message for guiding location of funeral service to the mourner terminals in response to determining that the mourner terminal is located at a first specific position of the funeral hall; and sending, by the main server, a greeting message pre-uploaded by the member terminal to the mourner terminals in response to determining that the mourner terminal is located at a second specific position of the funeral hall.

The identifying funeral information may include: transmitting, by the member terminal, a specific code at a predetermined time interval to the main server; transmitting, by the main server, a unique code to member terminal in response to the member terminal not transmitting the specific code at the predetermined time interval; collecting, by the main server, a position and a biometric information of the member terminal in response to the member terminal not responding to the unique code transmitted by the main server; transmitting, by the main server, an alarm to an emergency contact terminal having a predetermined relationship with the member terminal in response to determining that; the biometric information collected by the member terminal is in a dangerous state, the position of the member terminal is within a certain distance from a specific position, and a time at which the member terminal is staying at the specific position exceeds a predetermined time; and sending, by the emergency contact terminal, the notice of death to the main server.

The main server may be configured to send a final message to the mourner terminal in response to passing of a predetermined time after the death of member who is owner of the member terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

A brief description is given for the enhancement of understanding of the accompanying drawings to be referred to in the description of the exemplary embodiment, in which.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The message sending system for each of invited mourners at a time after death according to the exemplary embodiment includes a member terminal 20 and a main server 10 which is connected to the member terminal 20 through a wired or wireless network and with which information on an emergency contact terminal 30 having a predetermined relationship with member terminal 20 is registered, wherein the member terminal 20 uploads, to the main server 10, a list of mourners having a list of persons to be invited as mourners and a message to be delivered for each mourner, and the main server 10 determines, through the member terminal 20 and the emergency contact terminal 30, the time of death of a member who is the owner of the member terminal 20, sends a message registered for each mourners to mourner terminals 40 at the time of death.

Hereinafter, exemplary embodiments will be described in more detail with reference to the accompanying drawings for someone who has ordinary skill of this technical field may execute the exemplary embodiments. However present invention may be embodied in several different ways, and is not limited to the embodiments described herein.

In order to clearly illustrate the present invention, parts that are not related to the description are omitted, and same or similar elements are designated by the same reference numerals.

Also, The size and thickness of each component shown in the drawings are arbitrarily shown for convenience of explanation. Therefore, the present invention is not necessarily limited to the drawings, and the thickness is enlarged to clearly show various parts and regions.

Hereinafter, the structure of a message sending system according to an exemplary embodiment will be described in detail with reference to the accompanying drawings.

Figure 1:
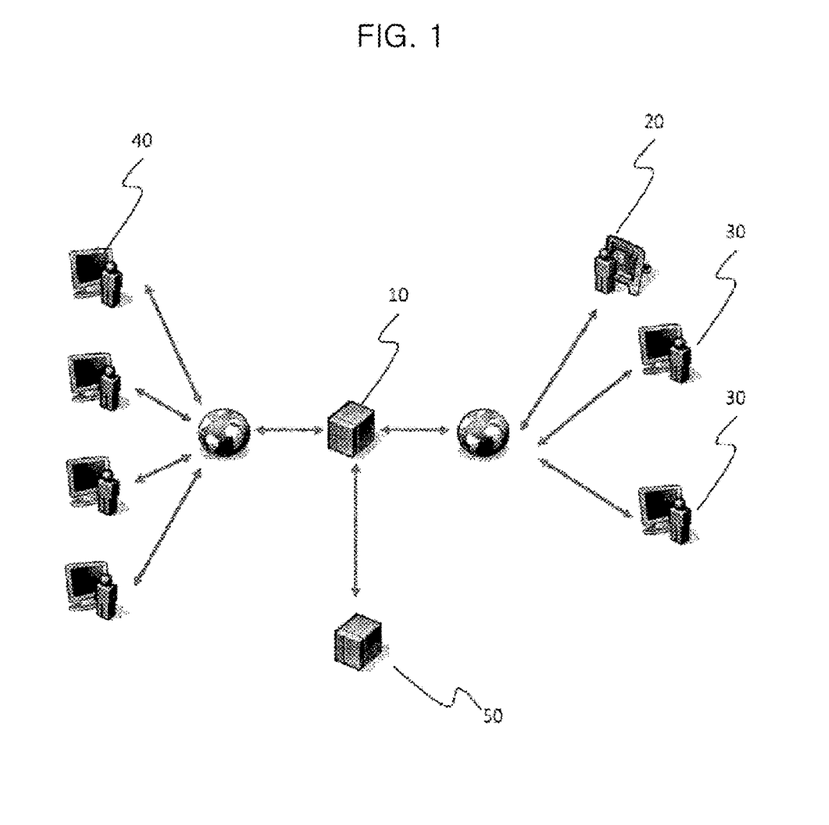
FIG. 1 is a schematic diagram illustrating a message sending system for sending message for each of invited mourners according to an exemplary.

FIG. 1 is a schematic diagram illustrating a message sending system for sending message for each of invited mourners according to an exemplary embodiment.

As shown in FIG. 1, message sending system for sending message for each of invited mourners at time after death according to an exemplary embodiment includes a member terminal 20, an emergency contact terminal 30, and a main server 10. At this time, the member terminal 20, the emergency contact terminal 30, and the main server 10 are interconnected through a wired or wireless network.

The member terminal 20 may be a mobile terminal device such as a mobile phone, a smart phone, or a tablet PC.

The member terminal 20 may include a biometric module for collecting biometric information of the member having the member terminal 20 and a GPS module for identifying a position of the member terminal 20.

The biometric module detects biometric information including pulse information, body temperature information, or etc. of a member having the member terminal 20 and transmits the detected biometric information of the member to the main server 10 at a predetermined interval.

The GPS module measures the current position of the member terminal 20 at a predetermined time interval and transmits the measured position of the member terminal 20 to the main server 10 at a predetermined time intervals.

The member terminal 20 may be a personal portable mobile terminal possessed by the member. The member who prepares the funeral process may store a list of the mourners to be invited to the funeral to the main server 10 through the member terminal 20.

In addition, various types of greeting messages to be sent to each mourner included in the list of mourners can be prepared and stored in the main server 10 in advance through the member terminal 20. At this time, the various types of greeting messages can be created in advance in the form of an image, a video, a recorded voice of deceased person, a letter, or a document, and can be uploaded to the main server 10 through the member terminal 20.

The greeting message may include a message created by the member and appeared himself or herself in the message, a video, recorded voice, or letter created by the member having preset message or a story to be delivered individually through the member terminal before the member having the member terminal dies.

Figure 2:
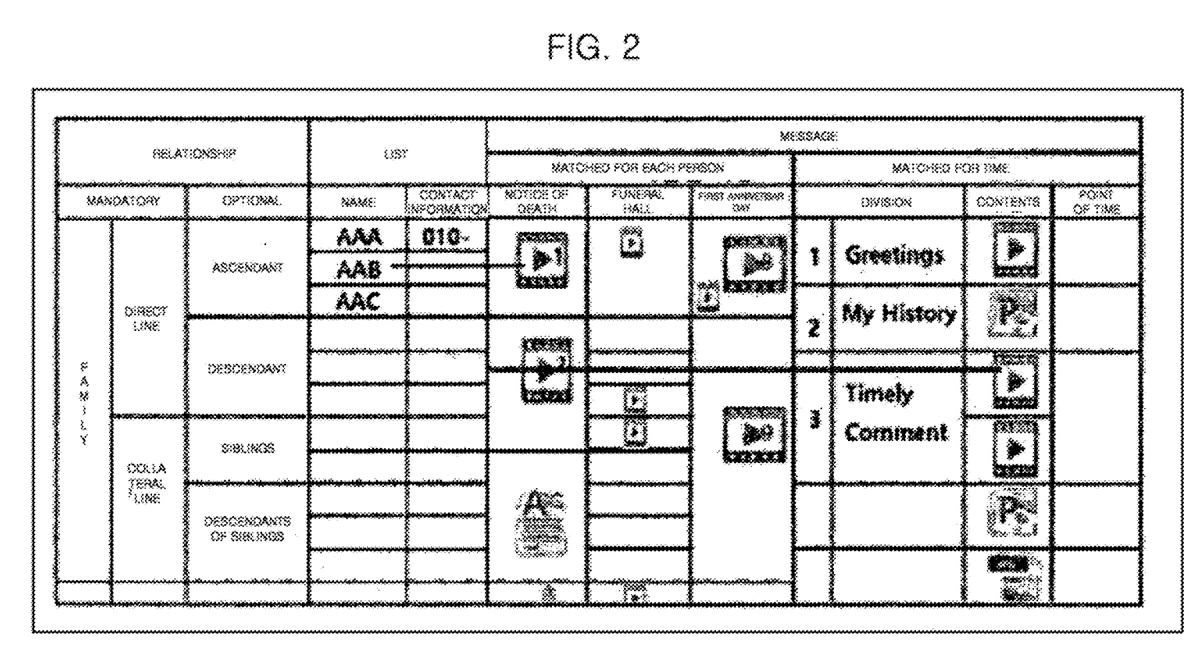
FIG. 2 is a diagram illustrating a method of uploading a list or mourners and a message through a member terminal 20 by the message sending system according to an exemplary embodiment.

FIG. 2 is a diagram illustrating a method of uploading a list or mourners and a message through a member terminal 20 by the message sending system according to an exemplary embodiment.

As shown in FIG. 2, the member creates the list of mourners to be invited to the funeral process when the member dies through the member terminal 20, and uploads the list or mourners to the main server 10. The list of mourners can include relationships with members, names, and contact information. In the case of a family member, the list of mourners can be divided into a direct line and a collateral line, and in the case of an acquaintance, the list of mourners can be created by dividing the mourners according to a relationship with a member (for example, alumni, colleagues and seniors/juniors).

At this time, an event for each mourner to be performed in the funeral procedure may be recorded through the member terminal 20. For example, certain event may be set up for specific acquaintance. The event may be a process to deliver notice of death for guiding funeral process to mourners terminal 40 through the main server 10, and then to deliver greeting message to the mourners terminal 40, which may be created and uploaded before death of the deceased member, and then to deliver preset message to the mourners terminal 40 after bearing the coffin out of the funeral hall.

Referring back to FIG. 1, the main server 10 determines whether a member having the member terminal 20 is dead through continuous communication with the member terminal 20. In order to determine the time of death of the member having the member terminal 20, the message sending system according to the embodiment may include an emergency contact terminal 30. The emergency contact terminal 30 is a terminal possessed by a person having a predetermined relationship with the member terminal 20. For example, the emergency contact terminal 30 may be a terminal possessed by a family member of the member having the member terminal 20.

The main server 10 stores map data for identifying locations of hospitals or funeral halls nationwide.

In addition, the message sending system according to the embodiment may further include a beacon terminal 50. The beacon terminal 50 is installed at a specific location of the funeral hall (for example, a funeral hall entrance or a portrait of the deceased) to measure the position of the mourners terminal 40 and transmit the measured position to the main server 10.

The beacon terminal 50 can determine the location of the mourners terminal 40 through a Bluetooth module provided inside the mourners terminal 40. The beacon terminal 50 may be installed in a funeral hall where a funeral procedure of a member is performed. A method of determining the position of the mourners terminal 40 through the beacon terminal 50 is common to those of ordinary skill in the art, and a detailed description thereof will be omitted herein.

Figure 3:
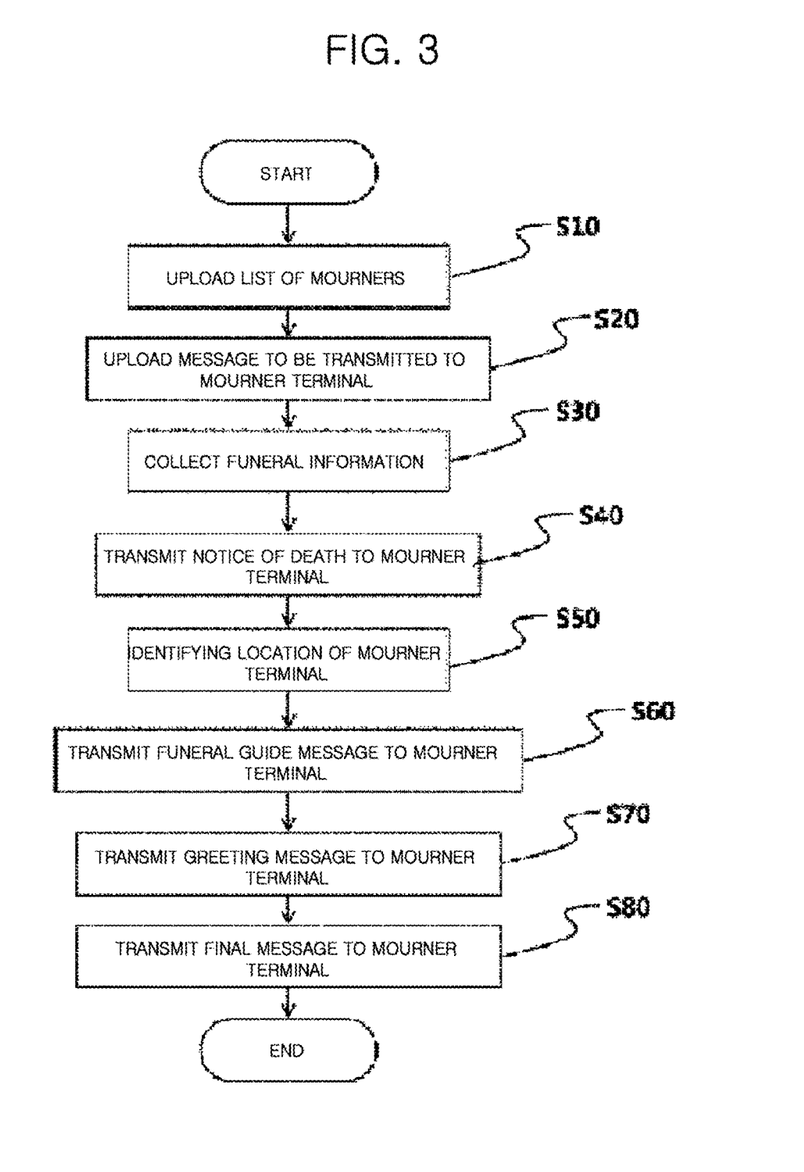
FIG. 3 is a flowchart showing a method of sending a message for each of invited mourners at time after death according to an exemplary embodiment.
Figure 4:
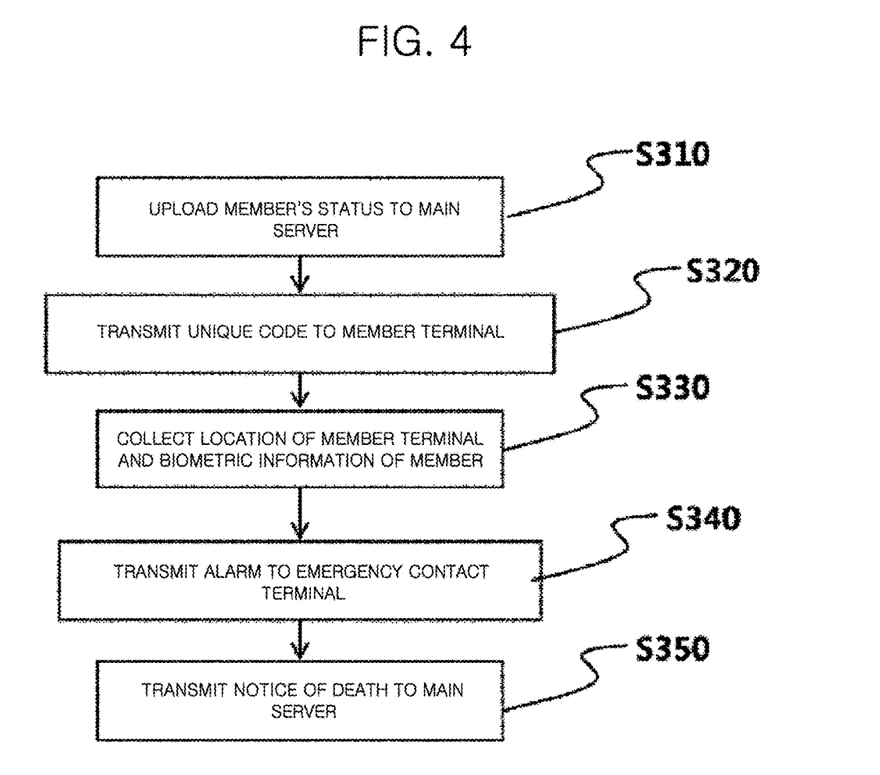
FIG. 4 is another flowchart showing a method of determining a time of death of a member having a member terminal according to an exemplary embodiment.

FIG. 3 is a flowchart showing a method of sending a message for each of invited mourners at time after death according to an exemplary embodiment. FIG. 4 is another flowchart showing a method of determining a time of death of a member having a member terminal according to an exemplary embodiment. Hereinafter, the operation of the message sending system according to the embodiment will be described in detail with reference to the accompanying drawings.

First, the member who has the member terminal 20 uploads a list of the mourners to be invited to the funeral when the member dies through the member terminal 20 (S10).

The member having the member terminal 20 uploads a message to be transmitted to the invited mourners through the member terminal 20 (S20). At this time, the message can be uploaded in the form of an image, a video, a recorded voice, a letter, or a document. The message may include an notice of death, a greeting message and a final message.

The main server 10 recognizes the funeral information of the member having the member terminal 20 (S30).

For more detail, referring to FIG. 4, a method of identifying funeral information of a member having the member terminal 20 will be described. The member having the member terminal 20 uploads his/her status to the main server 10 at a predetermined interval through member terminal 20 (S310).

The member who possesses the member terminal 20 may transmit a specific code at a predetermined time on every day through the member terminal 20, so the main server 10 can identify member's status. In this manner, by inputting a specific code to the main server 10 through the member terminal 20, it is determined whether the member having the member terminal 20 is living a normal life, hospitalize at a specific hospital, or it is in a state of being unable to communicate in the long term, such as traveling abroad.

If the specific code is not inputted to the main server 10 at a predetermined time interval through the member terminal 20, the main server 10 transmits a unique code to the member terminal 20 (S320). Here, the unique code may be a text or other alarm requesting a response of the member terminal 20 from the main server 10.

If there is no response to the unique code transmitted from the main server 10 to the member terminal 20, the main server 10 collects the location of the member terminal 20 and the biometric information of the member (S330). At this time, the position of the member terminal 20 can be identified through the GPS module provided in the member terminal 20, and biometric information of the member can be collected through the biometric module provided in the member terminal 20.

If the biometric information of the member collected through the member terminal 20 is in a dangerous state (for example, the heart rate is less than a predetermined number or the pulse rate is a predetermined number of times or less), position of the member terminal is within a predetermined distance (for example, within 50 meters) from specific location (For example, a funeral hall), and if the time at which the member terminal 20 stays in the specific location (for example, a funeral hall) exceeds a predetermined time (for example, one hour), then the main server 10 sends an alarm to the emergency contact terminal 30 to check the status of the member having the member terminal 20 (S340). For example, the main server 10 may send a text message to the emergency contact terminal 30.

The emergency contact terminal 30 transmits a notice of death including the time of death of the member, the funeral hall, and the date/time of carrying coffin out of the funeral hall to the main server 10 (S350).

When it is judged that the member having the member terminal 20 is dead through the emergency contact terminal 30, the main server 10 transmits a notice of death to the mourners terminal 40 registered in the previously registered list of mourners (S40).

The main server 10 determines the location of the mourners terminal 40 through a signal transmitted from the beacon terminal 50 installed in the funeral hall (S50).

If it is determined that the mourners terminal 40 is within the predetermined distance from the entrance of the funeral hall, the main server 10 transmits a funeral guiding message for guiding location of the funeral hall to mourners terminal 40 (S60). For example, you can send a funeral guiding message such as "the member's funeral hall is the first special hall on the third basement floor, you can find the way on right of hospital's main gate".

If it is determined that the mourners terminal 40 is within the set distance from the portrait of the deceased, the main server 10 transmits a greeting message to the mourners terminal 40 (S70). The greeting message is stored in the main server 10 through the member terminal 20 and stored in the main server 10 corresponding to the mourners terminal 40.

Meanwhile, the portrait displaying the photograph of the member having the member terminal 20 can be implemented as a digital portrait 60. The digital portrait 60 may be implemented through a general display device (e.g., an LCD, etc.), and a communication module may be provided therein to be connected to the main server 10 through a wired or wireless network.

The greeting message transmitted to the mourners terminal 40 may be displayed on the digital portrait in accordance with the timing of the condolence of the mourners.

In addition, the digital portrait may display a portrait message stored in the main server 10 through the member terminal 20.

The portrait message can include a message that compiles a compilation of pleasant fractions of life to be remembered as a person living a happy life, moments of happiness that have lived a lifetime, a video edited as a movie or edited as a slide show including some moments the member want to show.

In addition, the portrait message may include a message that conveys memories that can be remembered as a pleasant person as part of his/her last event. For example, in the late hours of a funeral (for example, at 12:00 pm), a message such as, "Thanks for coming, but please go home to give some rest for my children." can be transmitted.

Figure 5:
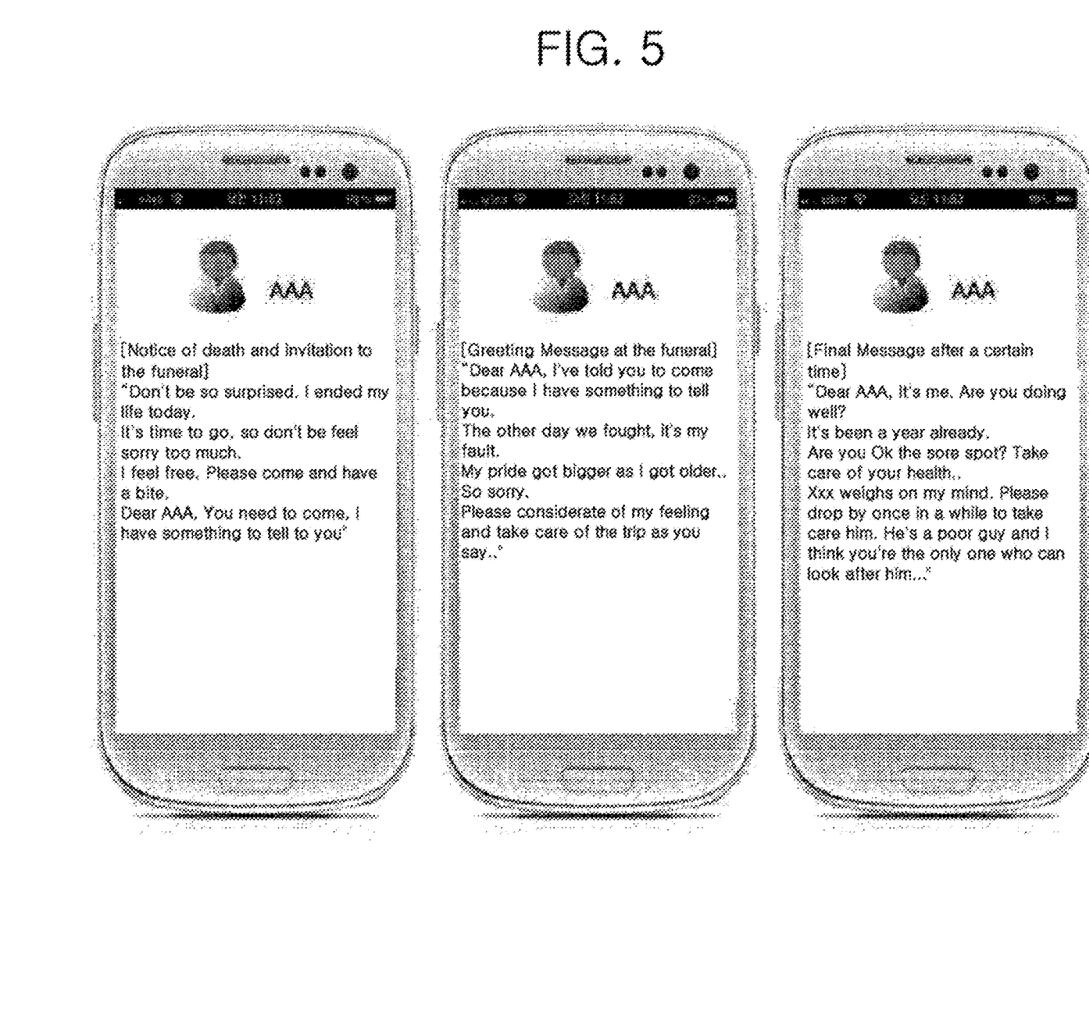
FIG. 5 is diagram showing exemplary messages for notice of death and invitation to the funeral, a greeting message at the funeral, and a final message after a certain time according to an exemplary embodiment.

FIG. 5 is diagram showing exemplary messages for notice of death and invitation to the funeral, a greeting message at the funeral, and a final message after a certain time according to an exemplary embodiment. As shown in FIG. 5, the greeting message is stored in advance in the main server 10 in correspondence with the mourner terminal 40. The greeting message at the funeral may be implemented as an image, a recorded voice, a letter, or a document, as described above.

The main server 10 transmits a final message to the mourner terminal 40 after a predetermined time (for example, one year) after the death of the member identified through the emergency contact terminal 30 (S80). The final message may be a message transmitted from the main server 10 to the mourner terminal 40 to guide the date of death of the member holding the member terminal 20. As described above, the final message can be transmitted to mourner terminal 40 through the main server 10, the message sending system according to the present invention roles as a digital portrait.

As described above, message sending system for each of invited mourners at time after death and method for sending after-death message using the system according to the embodiment, the user may easily send a notice of death by uploading the list of mourners to the main server 10, and the main server 10 may send the notice of death to the mourners terminal 40 at a specific point in time.

In addition, the greeting message and the final message are uploaded to the main server 10 through the member terminal 20 in advance, and the greeting message and the final message are transmitted to the mourner terminal 40 at a specific time, funeral process what member wants can be performed.

The message sending system for each of invited mourners at time after death and method for sending after-death message using the system according to the embodiment, as described above, can be used when the member having a member terminal dies, and then the notice of death and invitation to the funeral, the greeting message at the funeral, and the final message after a certain time are transmitted as an example. However, the exemplary embodiments are not limited thereto, and may be applied to other events such as marriage, engagement, or the like.

Meanwhile, in one embodiment, in the above-described the message sending system for each of invited mourners at time after death can be implemented by a computer program including a series of instructions for causing a method or apparatus to be performed. That is, the present invention may be a computer program running on a predetermined operating system, for example, a mobile operating system, and the program may process a process according to the series of instructions so that the method according to the present invention is implemented. In another embodiment, the storage medium may be a floppy disk, a CD, a DVD, a hard disk memory, various types of memory, or the like, in which the computer program is stored. A computer or similar electronic device, such as a smart phone, etc., that reads the computer program in the recording medium performs the method according to the present invention in accordance with the series of instructions on the computer program.

While the present invention has been particularly shown and described with reference to exemplary embodiments thereof, it is to be understood that the invention is not limited to the disclosed exemplary embodiments, but, on the contrary, And it goes without saying that the invention belongs to the scope of the invention.

The exemplary embodiment may be applicable to the message sending system for each of invited mourners at time after death and system for sending after-death message using the system.

The exemplary embodiments of the present invention may provide a system for sending message for each of invited mourners at time after death and method for sending after-death message using the system, which can accurately identify the time of death of the deceased member and timely send a notice of death and invitation to the funeral to listed mourners.

Also, another object of the exemplary embodiments of the present invention is providing system and method for transmitting message left by the deceased member to mourners who visit the funeral hall.

And also the other object of the exemplary embodiments of the present invention is providing system and method for capable to send a message left by the deceased member to mourners at a certain time after the death of the deceased person.

According to the exemplary embodiments, it is possible to easily notice death of member by uploading list of mourners to the main server 10 by the member terminal 20, and by transmitting an message for notice of death in the form of a moving picture, a nurture, or a letter to the mourners terminal.

In addition, the funeral process desired by the deceased member can be performed by uploading the greeting message and the final message to the main server 10 in advance and transmit the greeting message and the final message to the mourners terminal 40 at a certain point in time after point of death.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A message sending system, the system comprising:
a member terminal of a member;
a main server connected to the member terminal through a wired or wireless network; and
an emergency contact terminal having a predetermined relationship with the member terminal, information of the emergency contact terminal is registered in the main server,
wherein the member terminal is configured to upload, to the main server, a list of mourners comprising a list of persons to be invited as mourners and a message to be delivered to each of the mourners, and
wherein the main server is configured to:
determine, through the member terminal and the emergency contact terminal, the time of death of the member having the member terminal; and
in response to determining the time of death of the member, send a notice of the member's death to mourner terminals registered in the list of mourners.

2. The message sending system of claim 1, wherein the member terminal comprises:
a biometrics module configured to collect biometric information of the member having the member terminal; and
a Global Positioning System (GPS) module configured to identify a position of the member terminal,
wherein the member terminal is configured to transmit the biometric information of the member collected by the biometrics module and the position of the member terminal identified through the GPS module to the main server.

3. The message sending system of claim 1, further comprising:
a beacon terminal disposed at a specific location of a funeral hall, the beacon terminal configured to:
measure position of the mourner terminal by a near field communication with the mourner terminal; and
transmit the measured position of the mourner terminal to the main server.

4. The message sending system of claim 3, wherein the main server is configured to send a funeral guiding message for guiding location of funeral service to the mourner terminal in response to the beacon terminal determining that the position of the mourner terminal is at a specific position of the funeral hall.

5. The message sending system of claim 3, wherein the main server is configured to send a greeting message uploaded by the member terminal to the mourner terminal in response to the beacon terminal determining that the position of the mourner terminal is at a specific position of the funeral hall.

6. The message sending system of claim 1, wherein the main server is configured to send a final message to the mourner terminal in response to passing of a predetermined time after the death of member having the member terminal.

7. A method for sending message to invited mourners using a message transmission system comprising a main server, a member terminal, an emergency contact terminal, and mourner terminals, the method comprising:
uploading, by the member terminal, a list of mourners comprising a list of persons to be invited as mourners to the main server;
uploading messages to be sent to each of the mourner terminals of the mourners;
identifying funeral information;
sending, by the main server, a notice of death to the mourner terminal in response to identifying the funeral information;
sending, by the main server, the messages to the mourner terminal in response to determining that the mourner terminal is located at a specific position in a funeral hall.

8. The method of claim 7, wherein the sending of the messages comprises:
sending, by the main server, a funeral guiding message for guiding location of funeral service to the mourner terminals in response to determining that the mourner terminal is located at a first specific position of the funeral hall; and
sending, by the main server, a greeting message pre-uploaded by the member terminal to the mourner terminals in response to determining that the mourner terminal is located at a second specific position of the funeral hall.

9. The method of claim 7, wherein the identifying of funeral information comprises:
transmitting, by the member terminal, a specific code at a predetermined time interval to the main server;
transmitting, by the main server, a unique code to member terminal in response to the member terminal not transmitting the specific code at the predetermined time interval;
collecting, by the main server, a position and a biometric information of the member terminal in response to the member terminal not responding to the unique code transmitted by the main server;
transmitting, by the main server, an alarm to an emergency contact terminal having a predetermined relationship with the member terminal in response to determining that; the biometric information collected by the member terminal is in a dangerous state, the position of the member terminal is within a certain distance from a specific position, and a time at which the member terminal is staying at the specific position exceeds a predetermined time; and
sending, by the emergency contact terminal, the notice of death to the main server.

10. The method of claim 7, wherein the main server is configured to send a final message to the mourner terminal in response to passing of a predetermined time after the death of member who is owner of the member terminal.

* * * * *